(12) United States Patent
Higgs

(10) Patent No.: US 8,348,235 B2
(45) Date of Patent: Jan. 8, 2013

(54) BUTTERFLY VALVE WITH REMOVABLE VALVE DISC ELEMENT

(76) Inventor: Bryan Higgs, Hengoed Mid Glamorgan (GB)

( * ) Notice: Subject to any disclaimer, the term of this patent is extended or adjusted under 35 U.S.C. 154(b) by 907 days.

(21) Appl. No.: 12/295,156

(22) PCT Filed: Mar. 26, 2007

(86) PCT No.: PCT/GB2007/050152
§ 371 (c)(1),
(2), (4) Date: Dec. 15, 2008

(87) PCT Pub. No.: WO2007/110664
PCT Pub. Date: Oct. 4, 2007

(65) Prior Publication Data
US 2009/0114869 A1 May 7, 2009

(30) Foreign Application Priority Data
Mar. 28, 2006 (GB) .................................. 0606105.5

(51) Int. Cl.
*F16K 1/22* (2006.01)
(52) U.S. Cl. .......................... 251/298; 251/306; 251/361
(58) Field of Classification Search .......... 251/305–308, 251/359–364
See application file for complete search history.

(56) References Cited

U.S. PATENT DOCUMENTS

| | | | |
|---|---|---|---|
| 1,248,926 A * | 12/1917 | Schantz | 251/306 |
| 1,682,075 A * | 8/1928 | Foulds | 251/307 |
| 3,442,488 A | 5/1969 | Adams | |
| 3,905,577 A * | 9/1975 | Karpenko | 251/357 |
| 4,265,426 A * | 5/1981 | Thurston et al. | 251/306 |
| 4,428,395 A * | 1/1984 | Bravo | 137/385 |
| 4,944,489 A * | 7/1990 | Adams et al. | 251/306 |
| 5,377,954 A * | 1/1995 | Adams et al. | 251/306 |
| 5,564,679 A * | 10/1996 | Ericson et al. | 251/308 |
| 5,707,040 A * | 1/1998 | Gasaway | 251/306 |
| 5,934,647 A * | 8/1999 | Marbach | 251/306 |
| 6,079,695 A * | 6/2000 | Gasaway et al. | 251/305 |
| 6,367,771 B1 * | 4/2002 | Mazot | 251/305 |
| 7,264,221 B2 * | 9/2007 | Yeary et al. | 251/127 |

FOREIGN PATENT DOCUMENTS

| | | |
|---|---|---|
| DE | 17 75 012 B1 | 3/1971 |
| GB | 2031119 A | 4/1980 |
| JP | 10-259877 A | 9/1998 |

* cited by examiner

*Primary Examiner* — John Bastianelli
(74) *Attorney, Agent, or Firm* — Edwin D. Schindler

(57) ABSTRACT

A triple offset butterfly valve includes a valve body defining a valve orifice and a valve member rotatably mounted in the valve orifice. The valve member includes a disc element detachably mounted to a mounting plate; the valve member being mounted to a rotatable axle which extends between the disc element and mounting plane thereof. The valve body has an annular valve seat against which the disc element of the valve member seals when the valve is closed. In use, when the valve components become worn, the disc element of the valve member can easily be removed as a complete unit and replaced. In this manner, the need for a removable seal on the valve member is avoided, which reduces the number of potential leak paths as compared to known butterfly valves.

10 Claims, 1 Drawing Sheet

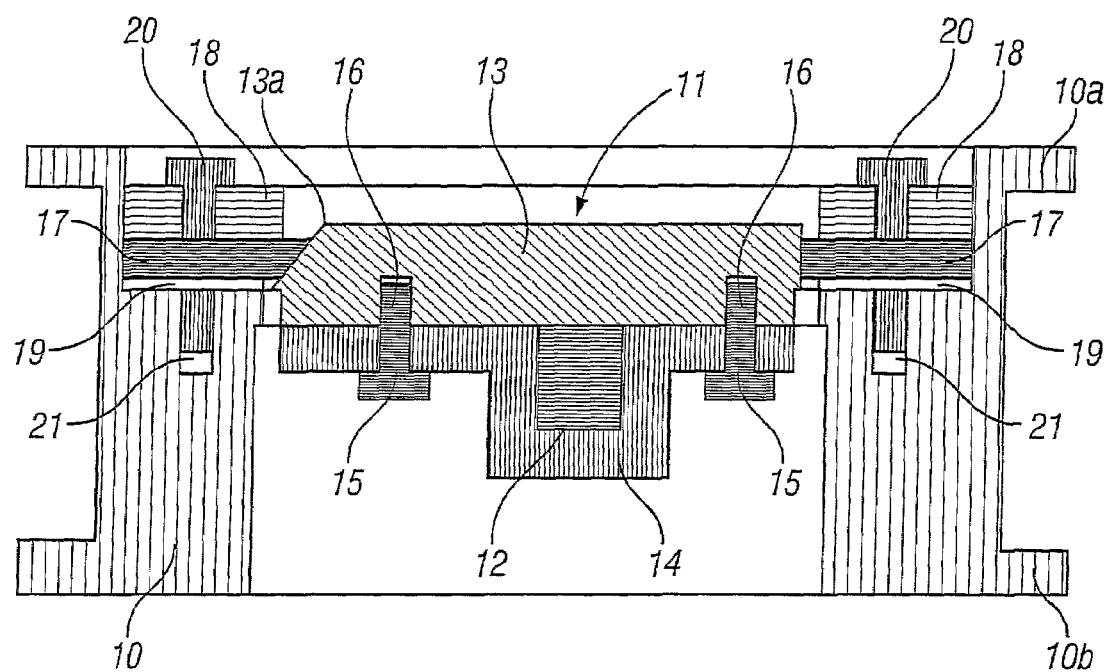

BUTTERFLY VALVE WITH REMOVABLE VALVE DISC ELEMENT

BACKGROUND OF THE INVENTION

1. Technical Field of the Invention

This invention relates to a butterfly valve for shutting off or regulating the flow of a fluid along a flow path.

2. Description of the Prior Art

A butterfly valve is a well known form of valve comprising a disc-shaped valve member, which is rotatably mounted in a valve orifice for movement about a diametral axis. Butterfly valves are commonly used as throttle valves in petrol and gas engines, and as flow control valves in fluid pipelines.

UK Patent No. GB2031198B discloses a butterfly valve for connecting in series with a fluid pipeline, the valve comprising an annular body portion defining a valve orifice and a disc-shaped valve member rotatably mounted in the orifice and having a frusto-conical side wall. The valve member is mounted to a diametral shaft which extends perpendicular to the through-axis of the annular valve body. An externally-mounted actuator is provided for rotating the disc-shaped valve member between an open position (in which it extends parallel to the through-axis of the valve body) and a closed position (in which it extends perpendicular to the through-axis of the valve body across the valve orifice).

When closed, a seal on the frusto-conical side wall of the disc-shaped valve member seals against a complimentary surface of an annular valve seat fitted concentrically to the valve body around the orifice therein.

In use, the valve member seal and valve seat wear against each other as the valve is opened and closed, to the extent that the valve begins to leak when closed. In order to overcome this problem, both the valve seat and valve member seal are replaceable items which are secured in situ by bolts.

A disadvantage of the above-mentioned arrangement is that fluid can leak through the gaskets which are interposed between the valve seat and the valve body, and between the valve member and the valve member seal.

We have now devised a butterfly valve which is less susceptible to leakage and which comprises component parts which can be replaced without compromising the integrity of the valve.

SUMMARY OF THE INVENTION

In accordance with this invention, there is provided a butterfly valve comprising a valve body defining a valve orifice and a valve member rotatably mounted in the valve orifice, the valve member comprising a disc element detachably mounted to a mounting plate, the valve member being mounted to a rotatable axle which extends between the disc element and mounting plate thereof, the valve body comprising an annular valve seat against which the disc element of the valve member seals when the valve is closed.

In use, when the valve components become worn, the disc element of the valve member can easily be removed as a complete unit and replaced. In this manner the need for a removable seal on the valve member is avoided, thereby reducing the number of potential leak paths compared with known butterfly valves.

Typically, the valve members of known butterfly valves are mounted in position by passing the turning axle through a bore which extends through the body of the valve member. The valve member is then fixed to the axle by inserting a pin radially into the axle through an aperture in the valve member. A disadvantage of this arrangement is that the torque required to turn the valve member against the flow of fluid in a pipeline can be substantial with the result that the pin could break.

Thus, preferably the axle comprises a portion intermediate its opposite ends, which is non-circular in section, the disc element and mounting plate of the valve member together defining a through-passage having a complementary cross-sectional shape to the axle. In this manner, the valve member is unable to rotate about the axle and the need for a pin is avoided.

Preferably the axle portion and the passageway are square or rectangular in cross section.

Preferably the passageway comprises a channel which extends across the mounting plate and/or across a surface of the disc element.

Preferably the mounting plate is fixed to the rear surface of the disc element, preferably by bolts which extend through the mounting plate into bores formed in the rear surface of the disc element. In this manner, the fixing of the mounting plate to the disc element does not create a potential leak path.

Preferably the disc element comprises a front surface, a rear surface and a frusto-conical side surface portion which tapers inwardly from the rear surface to the front surface.

Preferably the front and rear surfaces of the disc element are planar and parallel.

It can often be difficult and time consuming to carry out repairs and maintenance on known butterfly valves because the axle has to be withdrawn through the bore in the valve member, in order to allow the valve member to be removed from the valve body.

However, it will be appreciated that the present invention avoids this problem because the valve member is formed of two elements which can be separated from each other and from the axle, thereby alleviating the need to remove the axle.

Preferably the annular valve seat is detachable from the valve body, the valve seat preferably being secured to the valve body by bolts or other fastenings.

Preferably the annular valve seat comprises a frusto-conical surface for engaging the complimentary surface of the valve member.

Preferably the annular valve seat comprises a laminar construction of metal and graphite materials.

BRIEF DESCRIPTION OF THE DRAWING FIGURE

An embodiment of this invention will now be described by way of an example only and with reference to the accompanying drawing, the single FIGURE of which is a sectional view through a triple offset butterfly valve in accordance with the present invention.

DETAILED DESCRIPTION OF DRAWING FIGURE AND THE PREFERRED EMBODIMENTS

Referring to the drawing, there is shown a butterfly valve of the triple offset type for connecting in series with a fluid pipeline. The valve comprises a tubular valve body 10 having radially projecting flanges 10a, 10b at its opposite ends for respectively connecting to the like flanges of a adjacent fluid pipes. A valve member 11 is pivotally mounted inside a valve orifice defined by the valve body 10.

The valve member 11 is mounted to an elongate shaft 12, which extends across the valve orifice and which is rotatably mounted at its opposite ends to opposed portions of the valve body 10. One end of the shaft 12 extends through the wall of the valve body 10 into a gear box (not shown), which is mounted to the external surface of the valve body 10. An actuator (not shown) is connected to the gear box for rotating the shaft 12 about its longitudinal axis through an angle of approximately 90°. The axis of rotation of the shaft 12 extends parallel to, but offset from, a line which extends diametrically of the valve body 10, perpendicular to the through axis thereof.

The valve member 11 comprises a one-piece metal disc-shaped element 13 having planar front and rear surfaces, which extend parallel to each other. The disc element 13 further comprises a frusto-conical side wall portion 13a having a cone axis, which is inclined relative to the through axis of the valve body 10. The rear surface of the disc element 13 is mounted in face-to-face registration with the front surface of a circular mounting plate 14 of the valve member 11. The frusto-conical side wall portion 13a of the disc element 13 tapers inwardly from the rear surface towards the front surface thereof.

The rear surface of the mounting plate 14 is deformed outwardly to define a transversely-extending ridge. A square-section channel extends transversely across the front surface of the mounting plate 14, axially of the ridge.

The central section of the shaft 12 is also square in cross-section and is dimensioned to be a close-fit within the channel of the mounting plate 14. The shaft 12 is securely clamped between the rear surface of the disc element 13 and the front surface of the mounting plate 14 by bolts 15, which extend through apertures in the mounting plate 14 into blind internally threaded bores 16 formed in the rear surface of the disc element 13.

The internal surface of the tubular valve body 10 is formed with a forwardly-facing annular shoulder. An annular valve seat 17 is clamped between the shoulder and a clamping ring 18 by bolts 20, which extend through aligned apertures in the clamping ring 18 and valve seats 17 into blind internally threaded bores 21 that extend axially rearwardly of the valve body 10. An annular gasket 19 is disposed between the shoulder of the valve body 10 and the valve seat 17.

The valve seat 17 comprises an inwardly-facing frusto-conical surface, which is positioned such that when the valve member 11 is closed, the respective frusto-conical surfaces of the valve member 11 and valve seat 17 seal against each other in a fluid tight manner.

In use, the actuator (not shown) is arranged to turn the shaft 12 through 90° to cause the valve member 11 to move between the closed position shown in the drawings to an open position, in which the disc element 13 extends axially of the through axis of the valve body 10. The valve seat 17 is formed of laminar graphite and metal materials, such that when the valve member 11 is closed, the torque generated by the actuating mechanism deforms the valve seat 17 within its elastic limit, thereby deforming the valve seat 17 into the exact profile of the mating frusto-conical side wall portion 13a of the valve member 11.

The triple offset arrangement of the valve ensures that the respective frusto-conical surfaces of the valve member 11 and the valve seat 17 solely contact each other when the valve member reaches its fully closed position. This arrangement ensures that the frusto-conical surfaces do not rub against each other, thereby avoiding wear.

However, when the surfaces do become worn, it is relatively straightforward to replace both the valve seat 17 and the mating disc element 13 of the valve member 11 by removing the bolts 20, 15. It will be appreciated that the arrangement and positioning of the bolts 20, 15 do not create potential paths for fluid to leak through the valve when the valve member 11 is in its closed position.

It will also be appreciated that the valve member 11 can be removed from the valve body 10 without the need to withdraw the shaft 12. Accordingly, the present invention provides a butterfly valve which is relatively simple and inexpensive in construction, yet provides a reliable seal when the valve is closed which is not susceptible to leakage. Furthermore, the valve is relatively straightforward to repair and maintain.

The invention claimed is:

1. A butterfly valve comprising a valve body defining a valve orifice and a valve member rotatably mounted in the valve orifice, the valve member comprising a disc element detachably mounted to a mounting plate, the valve member being mounted to a rotatable axle which extends between the disc element and mounting plate thereof, the valve body comprising an annular valve seat against which the disc element of the valve member seals when the valve is closed, wherein said mounting plate is fixed to a rear surface of said disc element via bolts, the rear surface of the disc element being mounted in face-to-face registration with a surface of said mounting plate and with the bolts extending through apertures in said mounting plate into blind internally threaded bores formed in the rear surface of said disc element for minimizing potential leak paths across the valve member and for allowing the disc element and said mounting plate to be separable from each other and from the rotatable axle without being required to withdraw the rotatable axle from the valve orifice in which the butterfly valve is a triple offset butterfly valve.

2. A butterfly valve as claimed in claim 1, in which the axle comprises a portion intermediate its opposite ends, which is non-circular in section, the disc element and mounting plate of the valve member together defining a through-passage having a complementary cross-sectional shape to the axle.

3. A butterfly valve as claimed in claim 2, in which the axle portion and the passageway are square or rectangular in cross-section.

4. A butterfly valve as claimed in claim 2, in which the passage-way comprises a channel which extends across the mounting plate and/or across a surface of the disc element.

5. A butterfly valve as claimed in claim 1, in which the disc element comprises a front surface, a rear surface and a frusto-conical side surface portion which tapers inwardly from the rear surface to the front surface.

6. A butterfly valve as claimed in claim 1, in which the front and rear surfaces of the disc element are planar and parallel.

7. A butterfly valve as claimed in claim 1, in which the annular valve seat is detachable from the valve body.

8. A butterfly valve as claimed in claim 7, in which the valve seat is secured to the valve body by fastening elements.

9. A butterfly valve as claimed in claim 1, in which the annular valve seat comprises a frusto-conical surface for engaging the complimentary surface of the valve member.

10. A butterfly valve as claimed in claim 1, in which the annular valve seat comprises a laminar construction of metal and graphite materials.

* * * * *